Nov. 23, 1926.  1,608,162
J. BRENZINGER
HEADING MACHINE
Filed Nov. 19, 1923   14 Sheets-Sheet 8

INVENTOR
Julius Brenzinger
BY
ATTORNEY

Nov. 23, 1926.

J. BRENZINGER

HEADING MACHINE

Filed Nov. 19, 1923      14 Sheets-Sheet 10

1,608,162

INVENTOR
Julius Brenzinger
BY
ATTORNEY

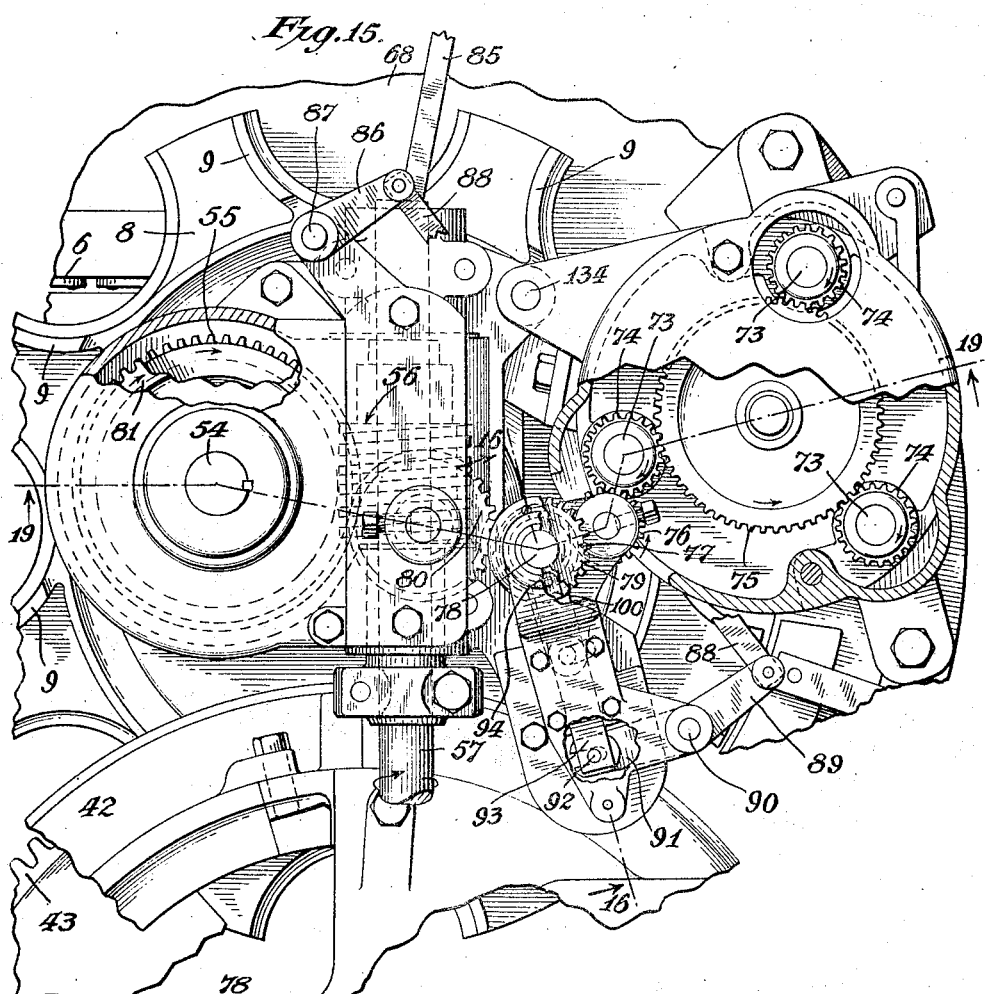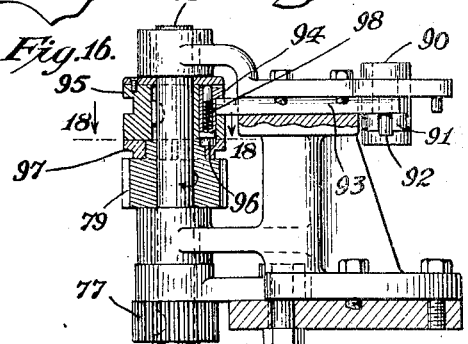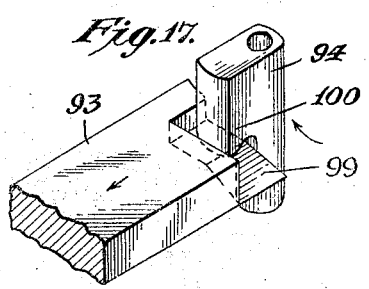

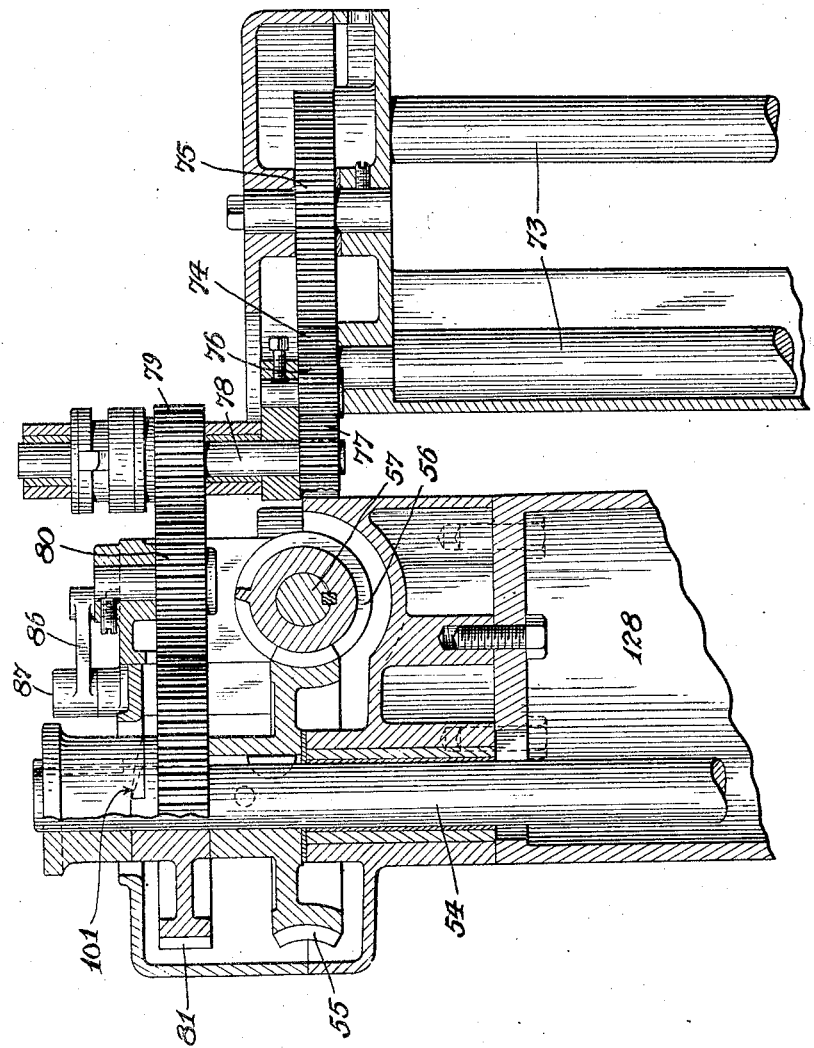

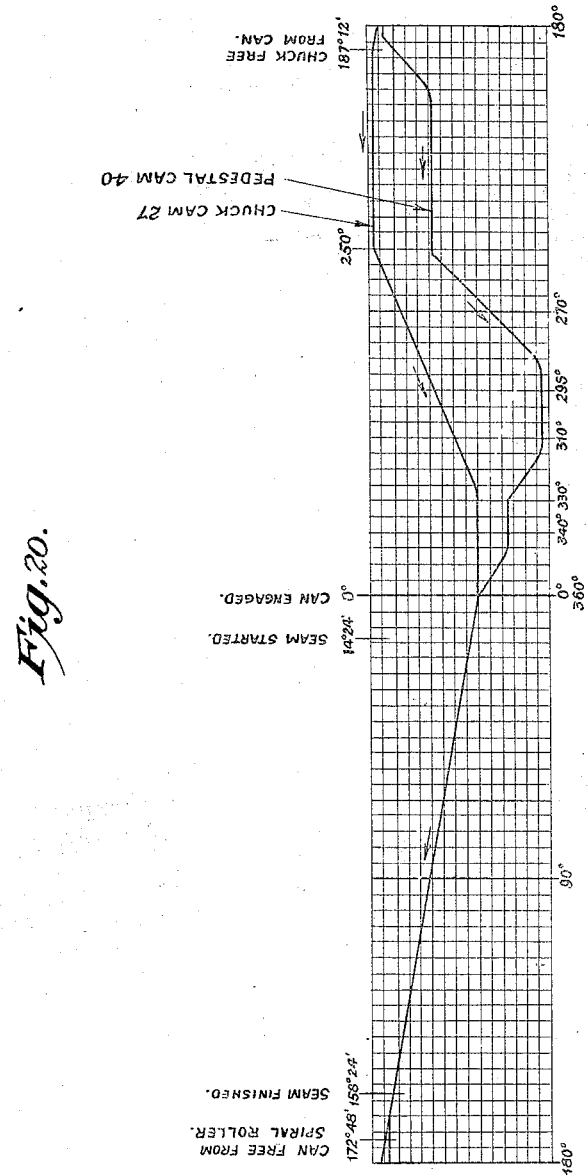

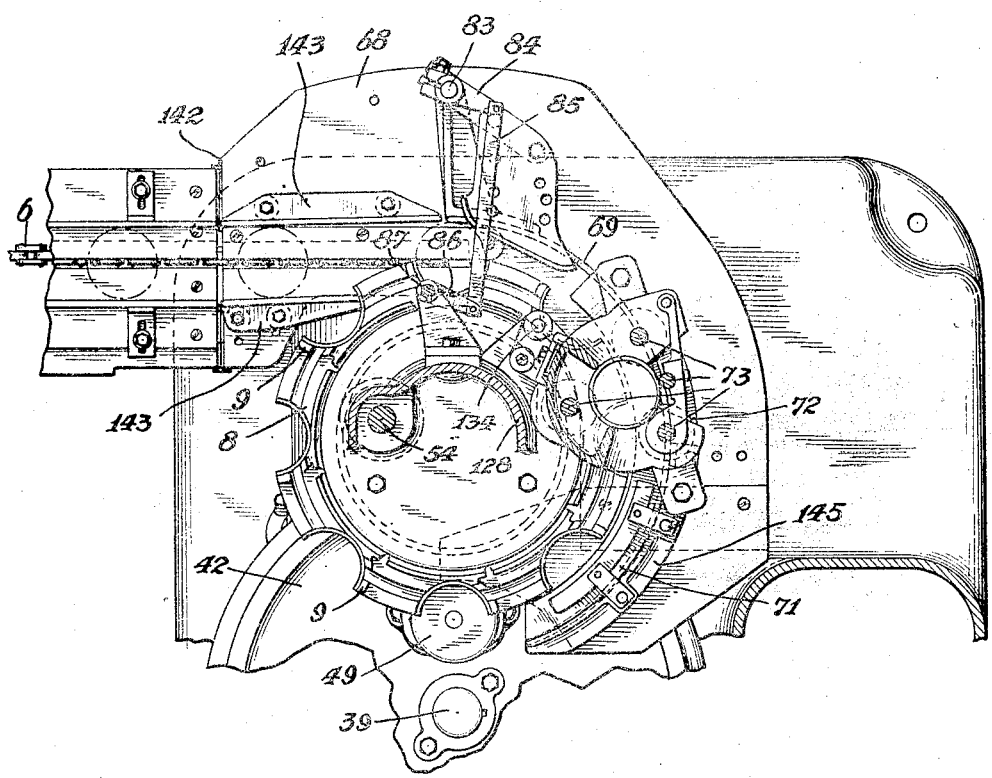

Patented Nov. 23, 1926.

1,608,162

UNITED STATES PATENT OFFICE.

JULIUS BRENZINGER, OF FAIRFIELD, CONNECTICUT, ASSIGNOR TO THE MAX AMS MACHINE COMPANY, OF BRIDGEPORT, CONNECTICUT, A CORPORATION OF NEW YORK.

HEADING MACHINE.

Application filed November 19, 1923. Serial No. 675,526.

This invention relates generally to heading machines and has more particularly reference to a machine in which the seaming tool employed is provided with a spiral seaming surface such as is disclosed in Patents Nos. 1,121,894 of Dec. 22, 1914 and 1,400,796 of Dec. 20, 1921; and the main, although not the exclusive, object and feature of this invention is to provide an automatic machine to which bodies and covers may be fed in constant succession and be united by a seaming tool of the character indicated.

In the accompanying drawings the invention is disclosed in a concrete and preferred form in which:

Fig. 15 is a top plan fragmentary view, with parts broken away and in section, of the parts adjacent the in-feeding turret and the cover feed mechanism.

Fig. 16 is a detail sectional view in the plane of line 16—16 of Fig. 15.

Fig. 17 is a perspective view of part of the clutch mechanism for the cover feed mechanism.

Fig. 18 is a detail horizontal sectional view on the plane of line 18—18 of Fig. 16.

Fig. 19 is a vertical sectional view on the plane of irregular line 19—19 of Fig. 15.

Fig. 20 is a diagrammatic view showing the action of the cams for operating the members of the work-holders and indicating the movement of said members with relation to each other and their joint movement during the seaming operation.

Fig. 21 is a view similar to the upper part of Fig. 5 showing adjustments made for a can body of different size from that shown in Fig. 5.

Figure 1:
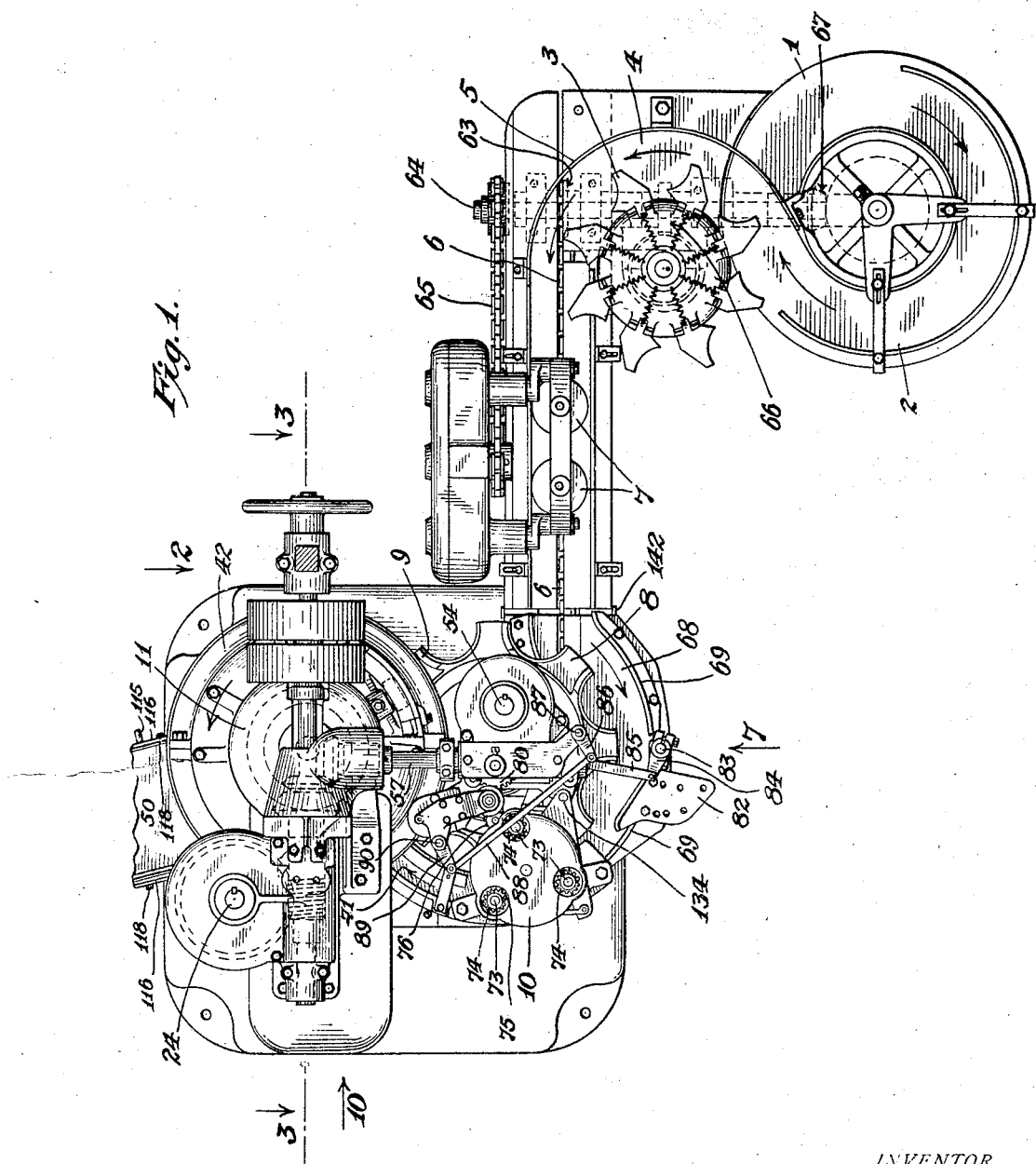
Fig. 1 is a top plan view of a machine embodying the invention.

The general arrangement of the parts can best be understood by first considering Fig. 1 where 1 indicates a rotatable dial for receiving filled can bodies in an upright position from any suitable source and for crowding them through channel 2 and into a position where they will be spaced by spacing mechanism 3 acting to slide the bodies over stationary table 4 in a curved path defined by rail 5 until said body comes into position over conveyor chain 6 which then feeds the bodies in a straight path beneath splash plungers 7 and into engagement with the pockets of rotating in-feeding turret 8 each pocket of which has a cover advancing member 9 which is in the form of a wing and which takes a cover from the cover source of supply 10 and feeds it into alinement with a can body to a work-holder in the heading mechanism generally designated by 11.

Figure 2:
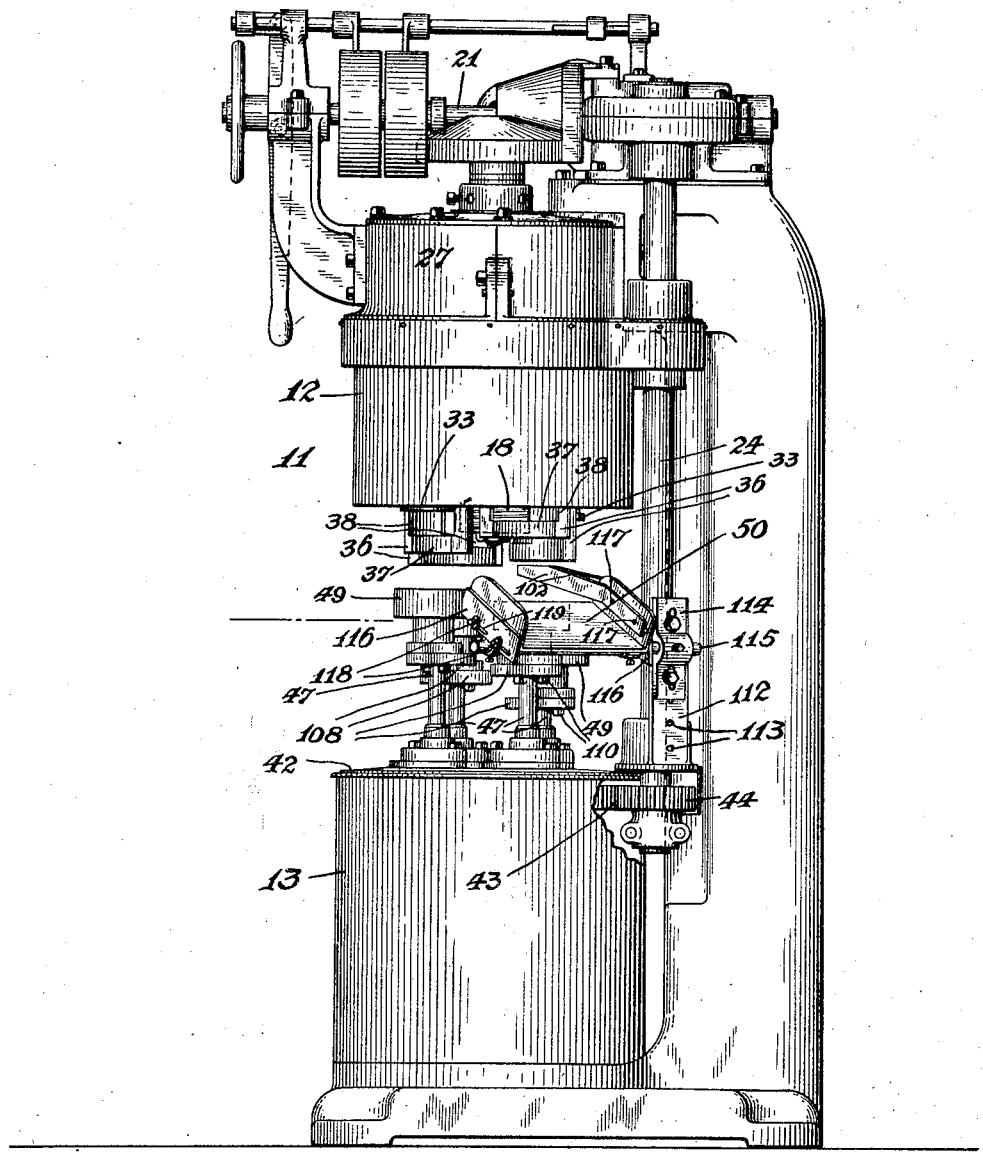
Fig. 2 is a view in elevation looking in the direction of arrow 2 in Fig. 1.
Figure 3:
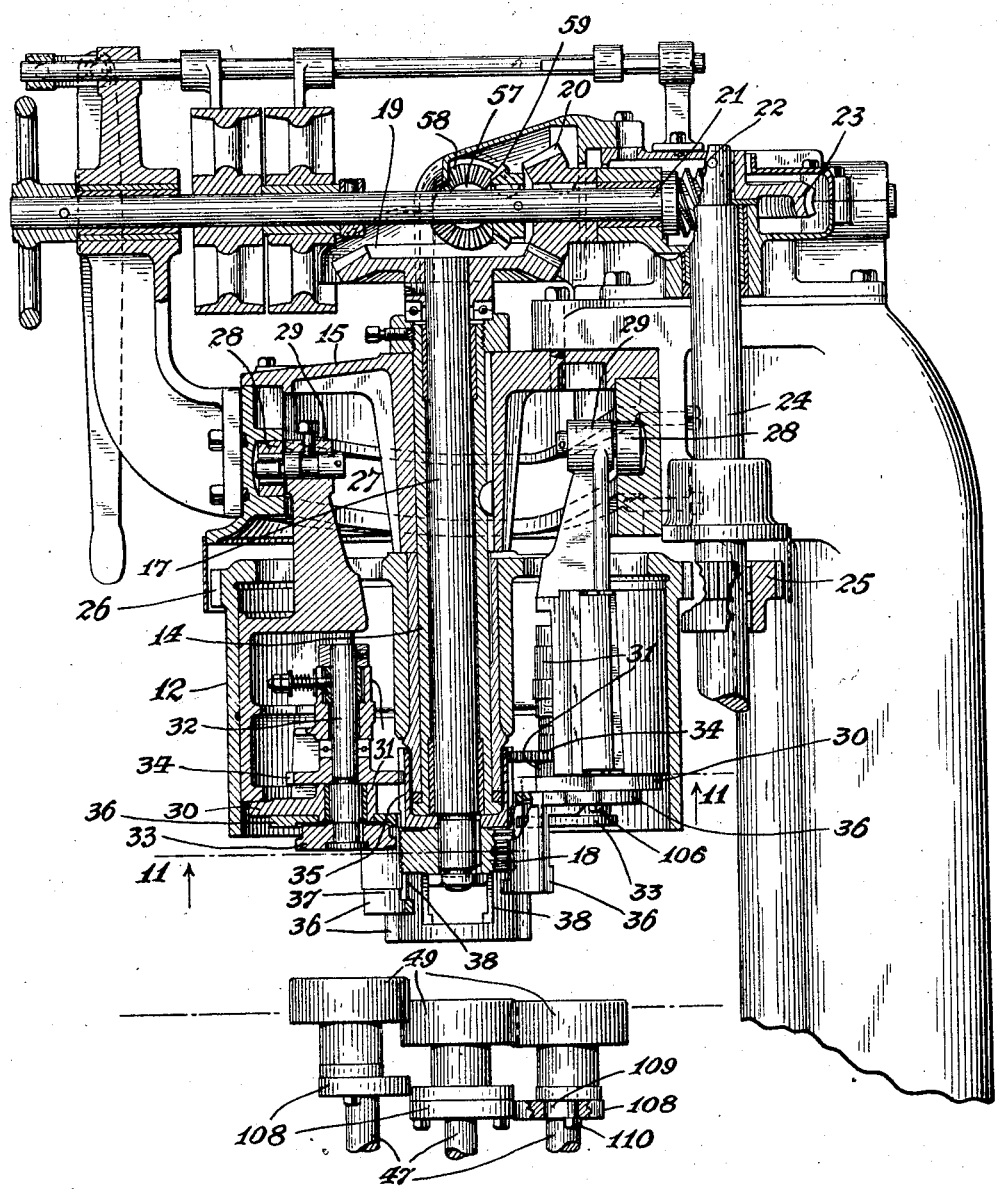
Fig. 3 is a vertical sectional view through the upper head taken substantially in the plane of line 3—3 of Fig. 1.
Figure 11:
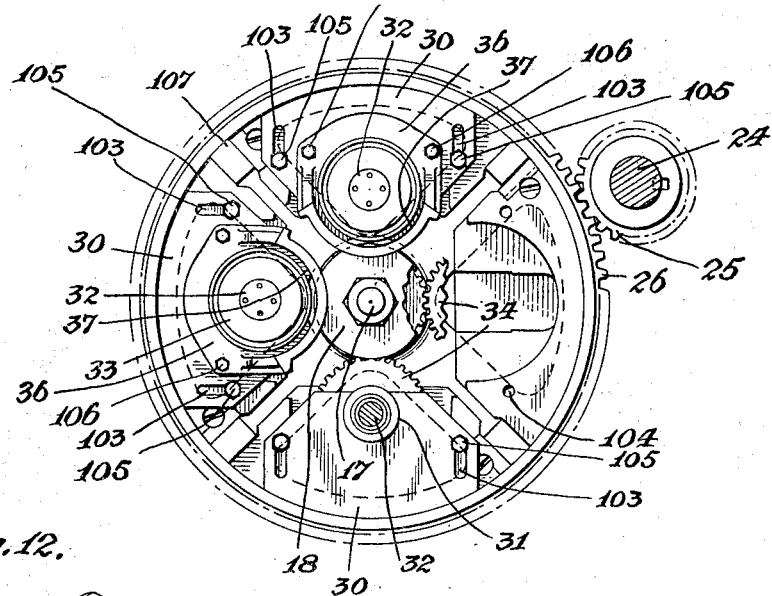
Fig. 11 is a bottom plan view of the upper head, partly broken away and in section, substantially on irregular line 11—11 of Fig. 3.
Figure 12:
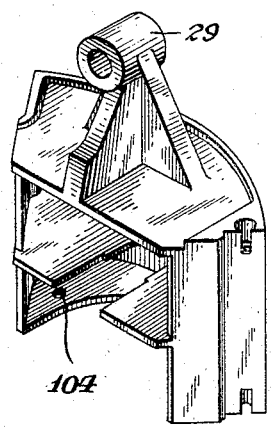
Fig. 12 is a perspective view of one of the chuck carriers.
Figure 13:
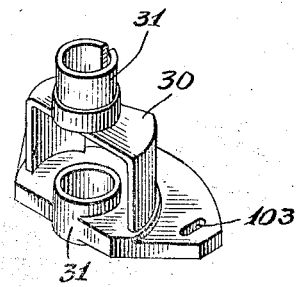
Fig. 13 is a perspective view of one of the chuck brackets.
Figure 14:
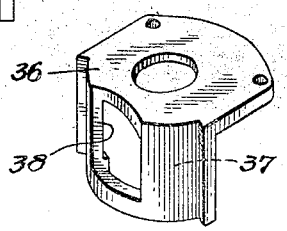
Fig. 14 is a perspective view of one of the can positioners carried by each chuck.

Turning now our attention to the workholding and seaming means, it will be seen from Fig. 2 that these devices consist generally of an upper and a lower head 12 and 13, the upper head being constructed as follows (see Figs. 3, 11, 12, 13 and 14): Upper head 12 is a revolving head mounted loosely on hollow member 14 which latter is supported by bearing 15 carried by the framework. Extending through hollow member 14 is a seaming tool spindle 17 carrying at its lower end a seaming tool 18 having a spiral seaming surface of the character disclosed in Patents Nos. 1,121,-894 of Dec. 22, 1914 and 1,400,796 of Dec. 20, 1921 and provided at its upper end with a bevel gear 19 driven from bevel pinion 20 on power shaft 21 which latter is provided with a worm 22 engaging worm gear 23 on upright shaft 24 that carries a spur gear 25 meshing with spur gear 26 on the outer circumference of revolving head 12. Mounted within the revolving head are a plurality of chuck carriers, one of which is shown in perspective view (Fig. 12), there being in the present instance four such chuck carriers. As indicated in Fig 11, each carrier is adapted to slide independently of the others in a direction parallel to the axis of the seaming tool. The means for effecting a vertical sliding movement of these carriers consists of a stationary cam 27, bolted to the framework, with which engages cam roll 28 carried by bearing 29 on each chuck carrier. Mounted on each chuck carrier is a chuck bracket 30 having bearing portions 31, 31 for the reception of chuck spindle 32 which latter carries at its lower end chuck 33. Also mounted on chuck spindle 32 is a gear 34 engaging with a gear 35 conveniently carried by a seaming tool spindle 17, said gear 35 being of considerable length so as to retain meshing engagement with gears 34 notwithstanding an up-and-down movement of the chuck carriers. 36 indicates a can positioner carried by chuck bracket 30, said positioner being provided with a curved positioning surface 37 that acts to center the can body on the lower chuck or pedestal and which is also provided in said curved positioning surface with a reversely curved cut-out portion 38 through which the seaming tool projects, said opening being of sufficient height to admit of the sliding movement of said positioner with the chuck carrier in respect to said seaming tool without interference.

Figure 4:
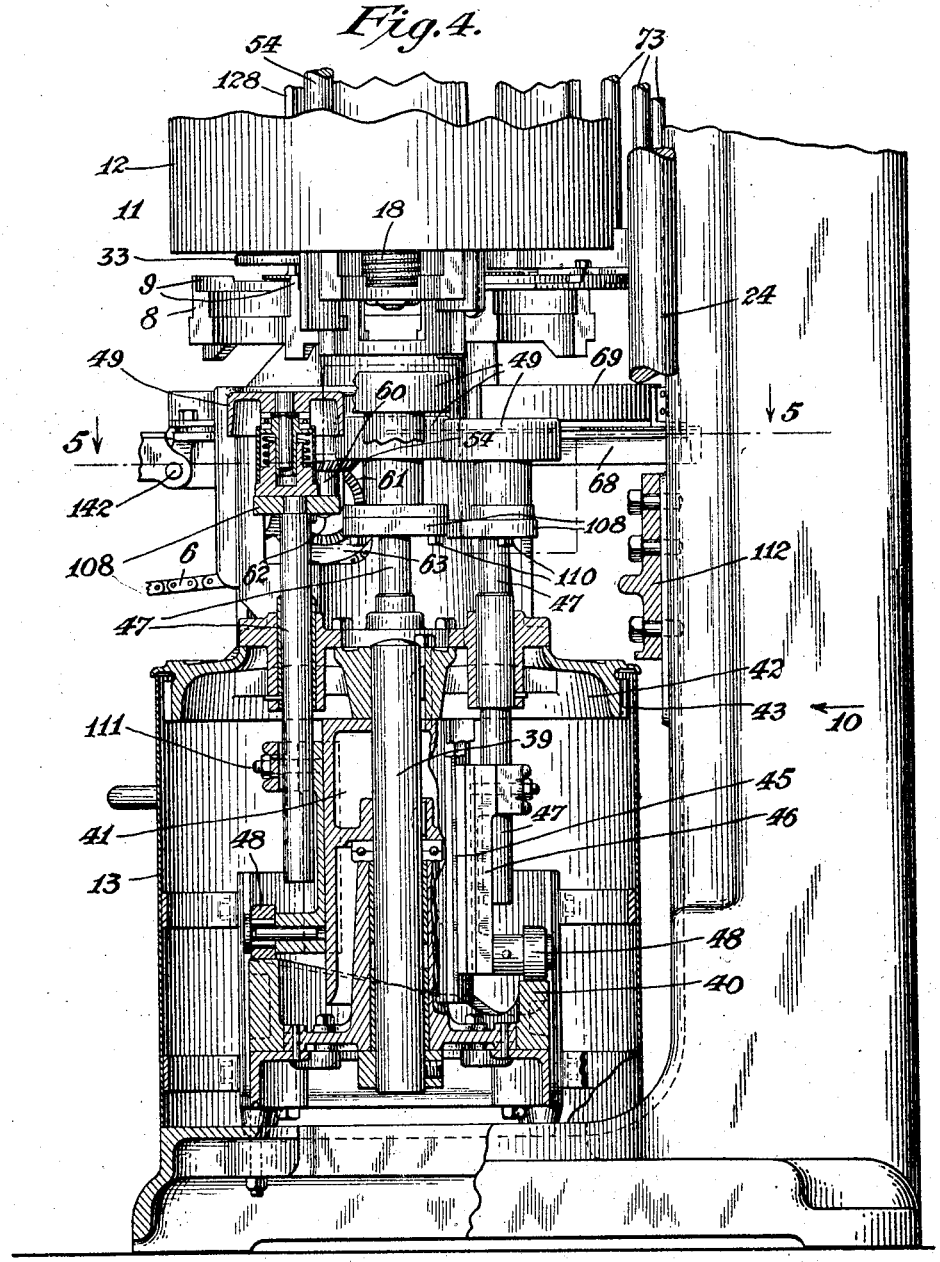
Fig. 4 is a vertical sectional view of the lower head taken substantially in the plane of line 3—3 of Fig. 1 and in the plane of line 4—4 of Fig. 5.
Figure 5:
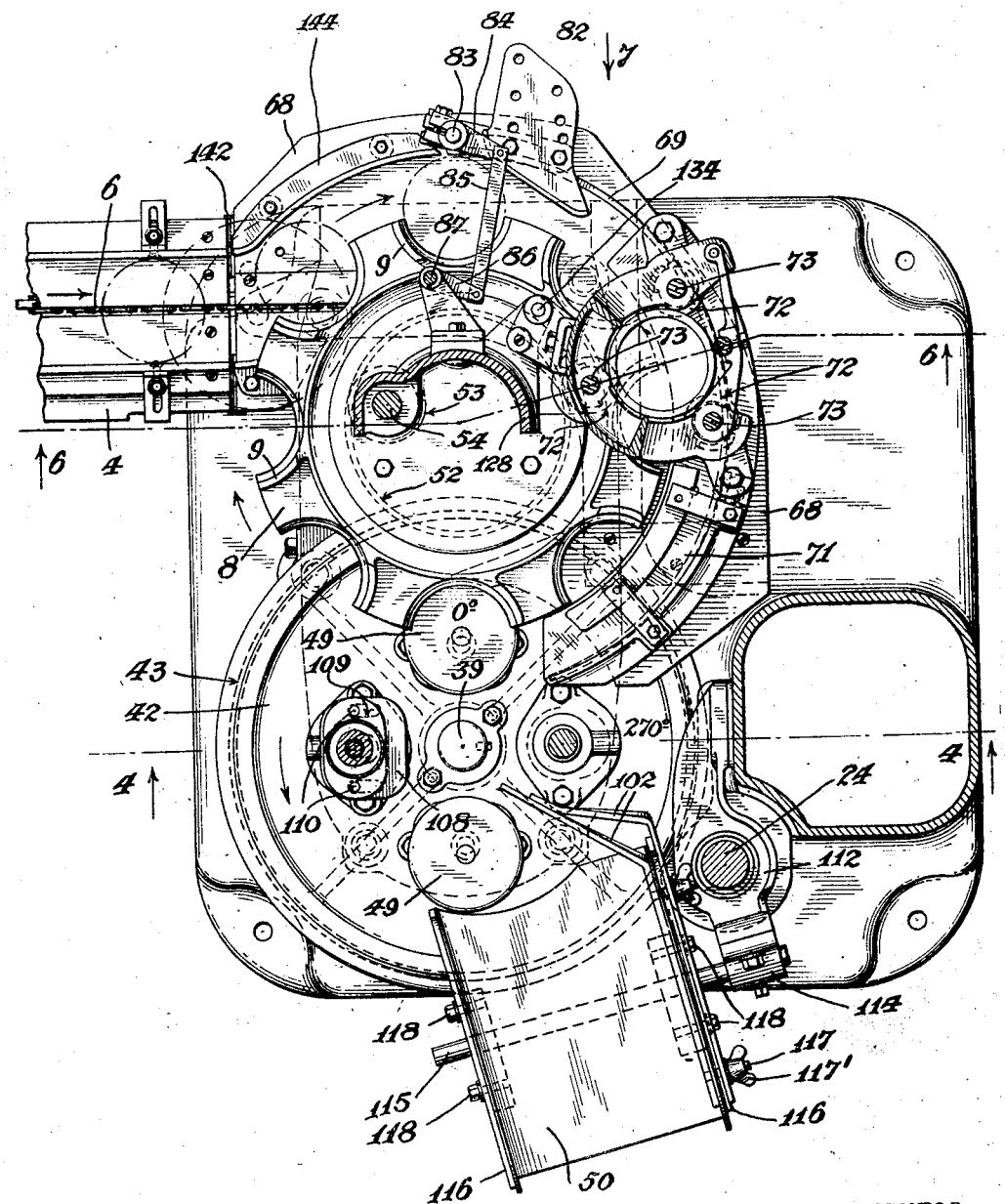
Fig. 5 is a horizontal sectional view in the plane of line 5—5 of Fig. 4.
Figure 8:
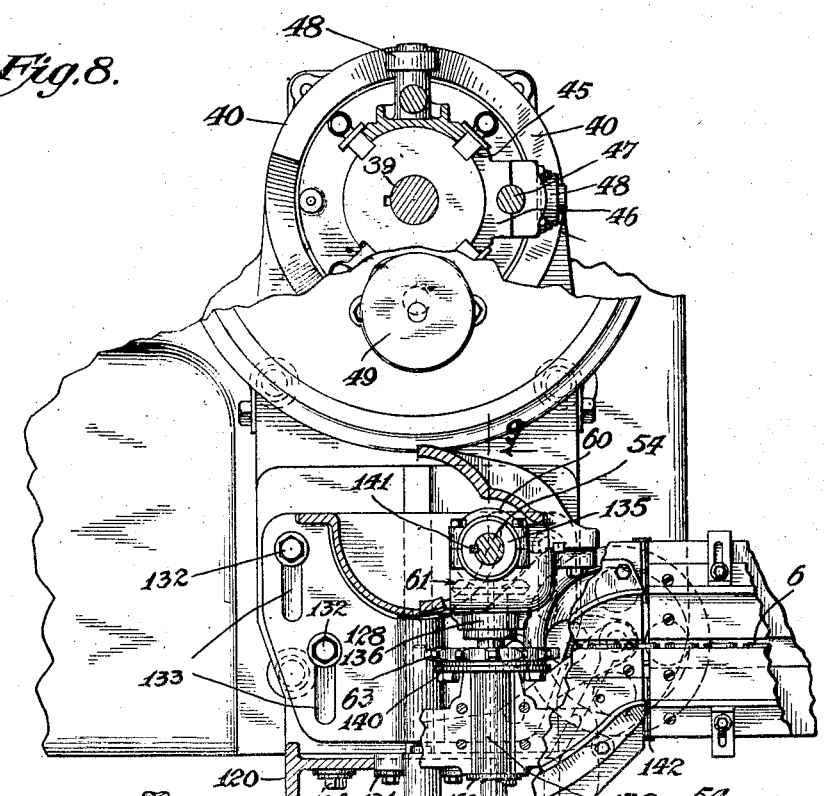
Fig. 8 is an irregular sectional view in the plane of irregular line 8—8 of Fig. 7.

The parts comprising the lower head are shown more particularly in Figs. 4 and 5 and are as follows: 39 indicates a vertical spindle at the lower end of which is provided a stationary cam 40 for effecting reciprocation of the lower chucks or pedestals carried by the spindle. Mounted on said spindle 39 is a carrying member 41 having at its upper end a spider 42 that carries a spur gear 43 meshing with spur pinion 44 (Fig. 2) mounted on shaft 24 whereby the lower head is revolved in unison with the upper head. Carrying member 41 is provided with a plurality of vertical guideways 45 in each of which there is a slide 46 carrying a lower chuck spindle 47 and provided with a cam roller 48 to engage stationary cam 40. (See also Figs. 8 and 10). Each of the lower chuck spindles 47 carries a lower chuck or base plate 49. 50 indicates a delivery chute for receiving the finished product.

Figure 9:
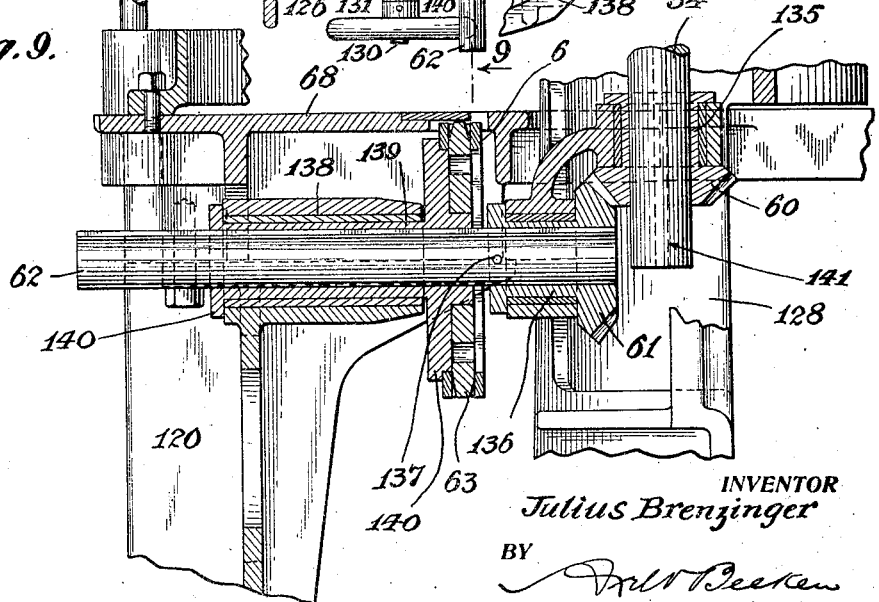
Fig. 9 is a detail sectional view in the plane of line 9—9 of Fig. 8.

The feeding-in turret 8 for the bodies and covers is shown in vertical section (Fig. 6) and rotates on bearing surface 51. This turret is provided with an internal gear 52 (see also Fig. 5) with which meshes a spur gear 53 mounted on shaft 54, this shaft (see Figs. 15 and 19) having near its upper end a worm gear 55 that receives motion from worm 56 carried by shaft 57, which shaft 57 (see Fig. 3) carries a bevel gear 58 meshing with bevel gear 59 on power shaft 21. Carried at the lower end of shaft 54 (see especially Figs. 6, 8 and 9) is a bevel gear 60 that meshes with bevel gear 61 on conveyor chain drive shaft 62; and this shaft 62 carries a sprocket 63 that operates conveyor chain 6, the other end of said chain passing over a sprocket 63 (Fig. 1) on shaft 64. From the latter shaft there is a sprocket chain drive 65 to splash the plungers, a gear drive 66 to the spacing mechanism and a bevel gear drive 67 to the in-feeding dial. Below turret 8 is a table 68 (see especially Figs. 1, 5 and 6) and as the can bodies are received from the conveyor chain 6 they are moved by pockets in the turret and are thereby passed over said table 68, the path of the bodies being defined by guides 69 and, in their travel to the work-holder, passed beneath cover feed mechanism 11, member or wing 9 acting to push a cover 70 through guides 71 (Figs. 5, 6 and 7) until the cover drops in position on the body and they are grasped by the work-holder.

Figure 6:
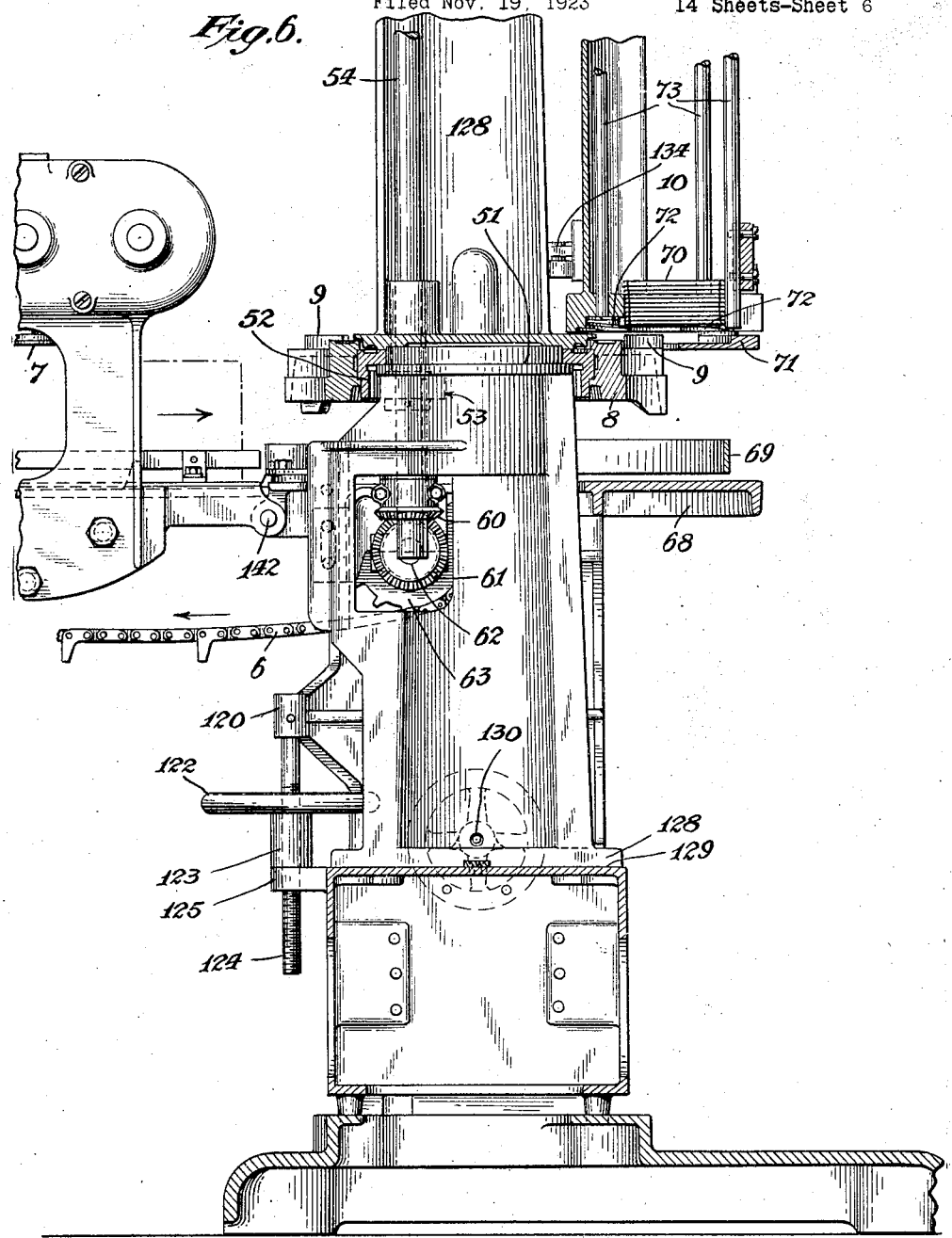
Fig. 6 is a vertical sectional view in the plane of irregular line 6—6 of Fig. 5.
Figure 7:
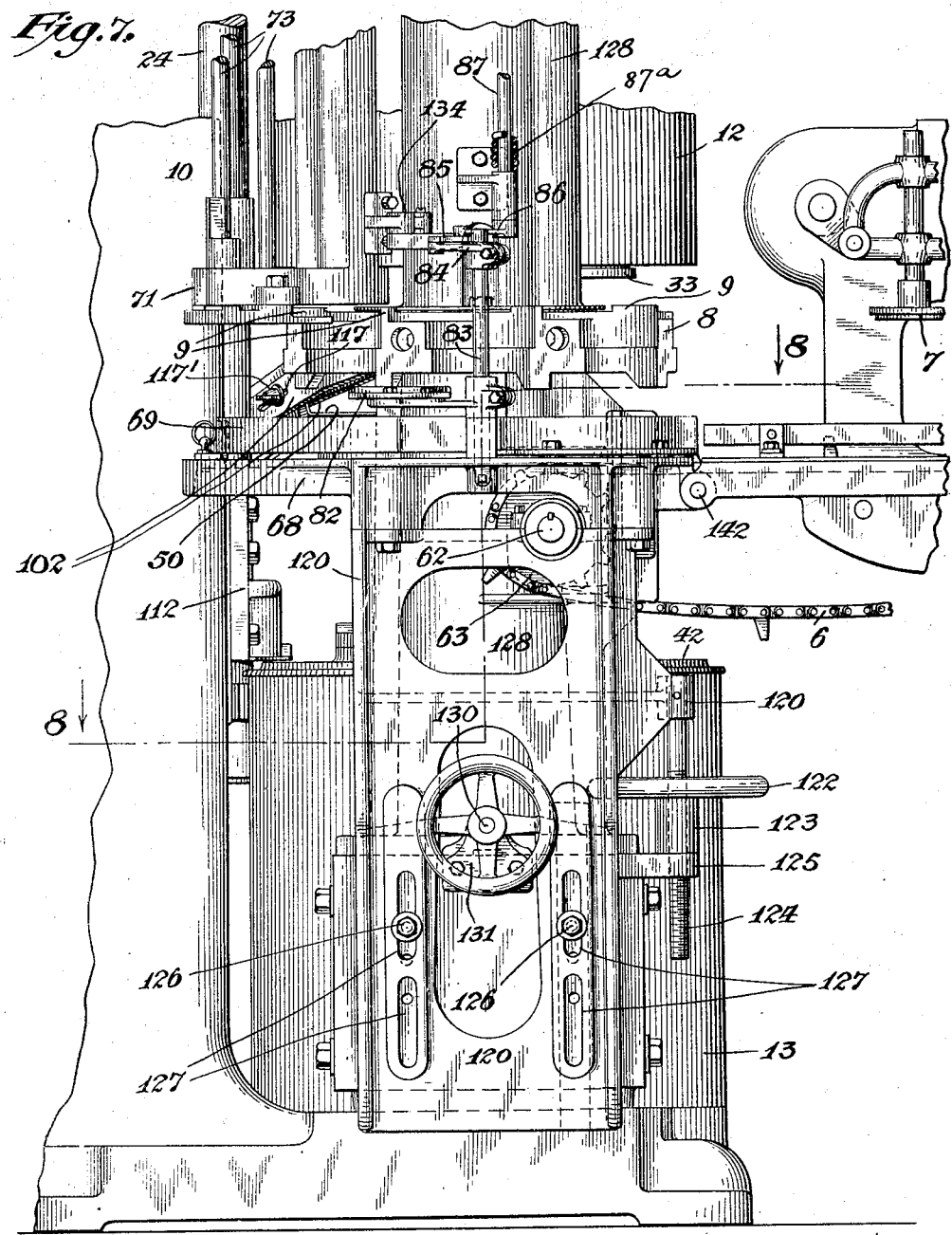
Fig. 7 is a view in elevation of the in-feeding turret and adjacent elements looking in the direction of arrow 7 in Figs. 1 and 5.
Figure 10:
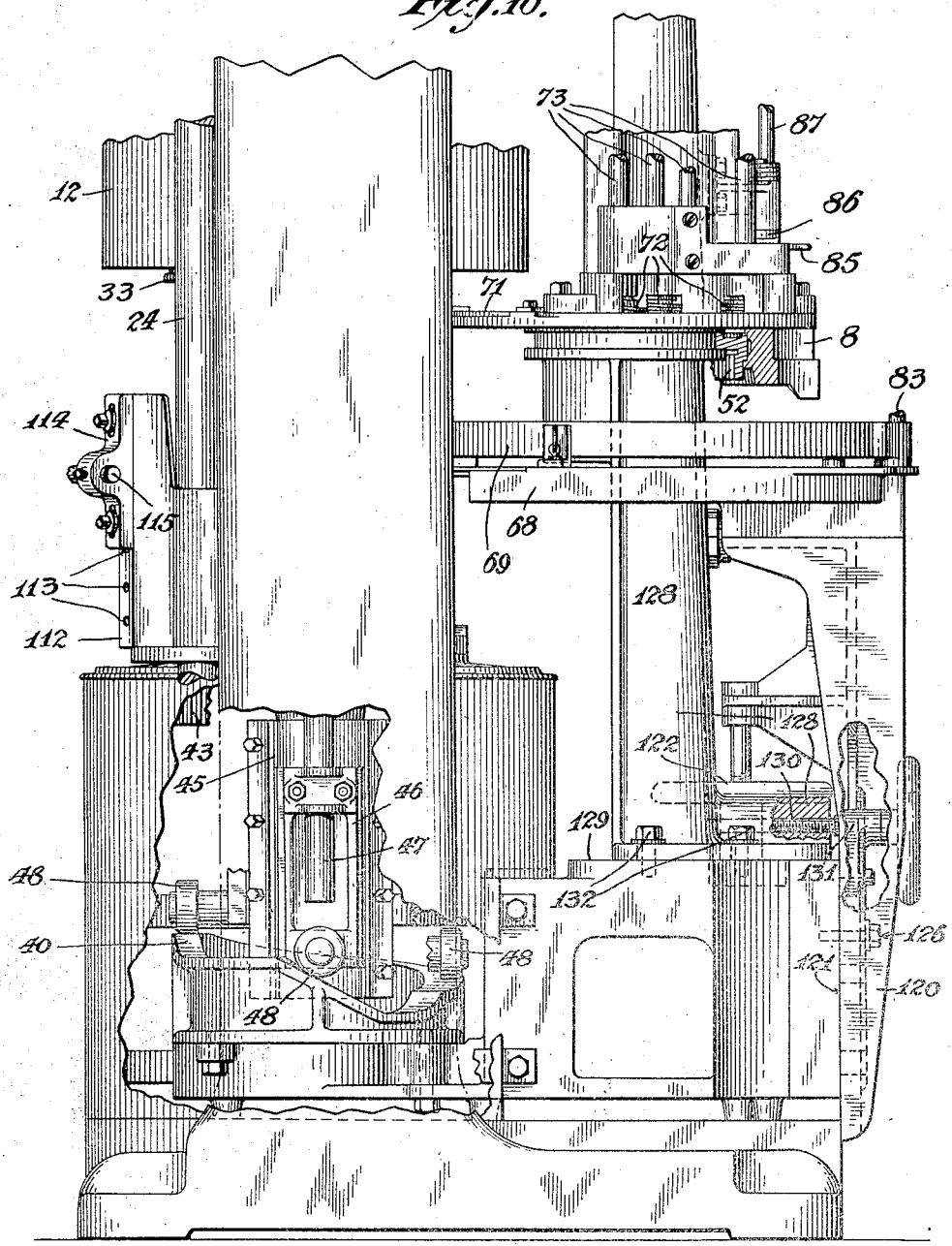
Fig. 10 is a view in elevation, with parts broken away and in section, of the in-feeding turret and parts of the lower head looking in the direction of arrow 10 in Figs. 1 and 4.

Any suitable means may be used to separate the covers from the stack 10 but, in the present instance, there are employed three spiral feeding-out rollers 72 (Figs. 6 and 10). These rollers are mounted on spindles 73 (see Figs. 6, 15 and 19) each of which carries at its upper end a pinion 74 meshing with a central idler 75. One of said pinions 74 drives idler 75 and the other two pinions 74 are driven from idler 75. The first mentioned pinion 74 meshes with an intermediate 76 and this intermediate meshes with a pinion 77 on shaft 78 that carries, at its upper end, another pinion 79 that receives its motion from gear 80 driven by gear 81 from shaft 54. Preferably, there is a clutch interposed in this train of gears whereby no cover will be fed by the spiral feeding-out rollers 72 unless a body has been fed to receive a cover. The means used in this instance for effecting this "no can no cover" control are as follows: 82 is a detector member (see Figs. 1 and 5) mounted on rockshaft 83 and adapted to project into the path of the bodies advanced by the turret over table 68. Connected with rockshaft 83 is an arm 84 from which extends a link 85 connected with arms 86 secured to rockshaft 87 supported on the framework (see Figs. 1, 5 and 15) and connected with link 85 on upper arm 86 is connecting rod 88, the other end of which is pivotally connected with arm 89 on rock-shaft 90 which latter carries a bifurcated actuating member 91 that engages a pin 92 carried by sliding member 93 (see Figs. 15, 16, 17 and 18); and it will be understood that if a can body is present at the proper time against detector member 82, then through the connections described sliding member 93 is moved to the right in Fig. 16 thereby bringing it out of engagement with clutch pin 94. Spring 87$^a$ on 87 restores parts to normal position. As will be seen in Fig. 16, gear 77 is fast on shaft 78 but gear 79 is loose on said shaft and imparts its motion to said shaft by means of clutch member 95 which is fast to the shaft. Clutch member 95 carries clutch pin 94 which normally tends to descend into opening 96 of member 97 secured to loose gear 79. The tendency of clutch pin 94 to descend into opening 96 is due to expansion spring 98 and, so long as said clutch pin is in engagement with opening 96, power is transmitted from gear 79 to shaft 78 and thence to feeding-out rollers 72 of the cover feed mechanism. When, however, detector member 82 is not moved outwardly by a can body, then through the connections previously described, and by reason of spring 87$^a$, sliding member 93 will move to the left in Fig. 16 and cam face 99 (Fig. 17) will be in the plane of projection 100 of clutch pin 94 so that when rotation of clutch member 95 carrying said pin 94 brings the latter around to the point where sliding member 93 is located, then said clutch pin will ride up cam surface 99 and its lower end will thereby be withdrawn from opening 96 of gear 79 and hence no power will be transmitted to feeding-out rollers 72. Referring to Fig. 19, it is preferred to interpose additional clutch mechanism in this train of gears which, however, is for a widely different purpose. It will be observed that gear 81 is loose on shaft 54 and is driven from said shaft by means of slipping clutch 101. In this way, rotation in one direction of shaft 54 will, through clutch 101, drive gear 81 and the cover feeding mechanism; but backward rotation of shaft 54, sometimes found useful in operating the machine by hand and setting it preliminarily for power operation, will fail to transmit power to gear 81 and hence the cover feed mechanism will not be operated.

The operation of the device is as follows: Can bodies are fed to the table 68 by the means described and are then engaged by one of the pockets in turret 8, the body passing by detector member 82, throwing the same outwardly, so as to render the transmission to the cover feeding-out roller 72 operative. The cover by rotation of member 72 is fed downwardly from a stack and eventually reaches channel member 71. As the body comes into position below the cover stack, wing 9 on the turret engages the lowermost and free cover resting in guide 71 and carries it along in alinement with the body until the point where guide 71 terminates (see Fig. 5) at which point the body is placed on pedestal or lower chuck 49. When the cover reaches the end of guide 71, it drops on the body below and the upper chuck then descends and the lower chuck or base plate rises and the body and cover are clamped together as the work-holder revolves; and, at the same time, the work-holders are rotated by the gear drive from gears 34 and 35 (see Fig. 3). After the work is thus clamped, the upper and lower chucks both rise during the seaming operation, the extent of the rise being proportionate to the lead of the spiral thread of the spiral seaming surface on the seaming tool in a manner well understood, the work-holder meanwhile revolving around the seaming tool which latter rotates in a direction opposite to that of the individual work-holders. After the seaming operation is completed the now united body and cover reach delivery chute 50 where they are engaged by ejecting member 102, which sweeps the now closed can out of the machine. When the can is transferred from a pocket of the turret to a pedestal, it is moved against the positioning device (Fig. 14), the curved surface 37 of which acts to properly center the body so that the seaming tool, projecting through opening 38, will properly perform its function in seaming the cover to the can. By referring to Figs. 5 and 20, the seaming operation will be thoroughly understood. The diagram in Fig 20 should be read from right to left; and from this diagram the action of cams 27 and 40 may be observed. Beginning at the point of 180°, which is the moment that the can body is discharged from the work-holder, it will be observed that there is a slight rise in chuck cam 27 and that there is considerable drop in pedestal cam 40. The chuck and pedestal now remain at a constant level for a number of degrees when the pedestal cam lowers the pedestal at a rather rapid rate of speed, the position of 270° being indicated in Fig. 5 at the right. At the same time, the chuck cam 27 lowers the chuck but at a lesser rate of speed than the lowering of the pedestal. Chuck cam 27 then has a neutral surface for about 30° and meanwhile pedestal cam 40 is raising the pedestal until zero position is reached, said position being indicated in Figs. 5 and 20 at the point marked "can engaged." It will now be observed from Fig. 20 that the rise in chuck cam and pedestal cam 40 is coincident during the seaming operation which occupies nearly half a revolution of the cams; and that then, after the seam is finished, the pedestal and chuck are slightly separated by their cams at the point 180° so that ejecting finger 102 may sweep the can out of the machine.

In view of the fact that the machine under consideration must act on containers of different sizes, that is of different height and diameter, it is necessary to provide means whereby the parts may be adjusted so as to compensate for the difference in the size of the containers. So far as the seaming mechanism is concerned, the seaming tool remains unchanged but the upper and lower chucks have to be adjusted radially with respect to the axis of rotation of the seaming tool and must also be adjusted in a direction parallel thereto, these adjustments being, in the present instance, accomplished in the following manner: Referring to Figs. 3, 5, 11, 12, 13 and 14, it will be seen that chuck bracket 30 is provided with elongated slots 103 that are secured by means of screws 105 that are threaded into openings 104 in the chuck carrier. This adjustment will bring the upper chuck nearer to or farther away from the center of rotation of the seaming tool and will carry with it positioner 36 which is secured by means of screws 106 to chuck bracket. It will be understood that with this construction, the chuck carriers will always remain in the same position and their sliding movement between the walls of head 12 and vertical guides 107 will remain undisturbed with respect to any radical movement. Referring to Figs. 4 and 5, the lower chucks are adjusted in the following manner: Stem 47 carries a support 108 which is provided with elongated slots 109 in which the yielding pedestal or lower chuck 49 is adjustably mounted by means of screws 110. Stem 47 is secured to sliding member 46 by means of bolts 111 and it will be obvious that by loosening these bolts and moving the stem up or down, the height from the pedestal or lower chuck will be varied. Referring to Figs. 2, 5 and 10: 112 indicates a bracket having a number of openings, as 113, in its surface to which may be adjustably bolted plate 114 that supports delivery chute supporting rod 115. This rod carries two brackets 116 in which delivery chute 50 is adjustably mounted as by means of wing nuts 117, screws 118 and elongated slots 119 so that the delivery means may be adjusted up and down and nearer to or farther away from the seaming mechanism. Ejector finger 102 is likewise adjustably mounted on brackets 116. Referring particularly to Figs. 6, 7, 8, 9 and 10, it will be seen that table 68 forms part of, or is secured to, vertically adjustable member 120. This member, as will be seen from Fig. 10, may be adjusted on finished surface 121, this being accomplished by means of hand-wheel 122 carrying threaded bushing 123 that engages a threaded stem 124 mounted against rotation on adjustable member 120. Threaded stem 124 passes through an unthreaded opening in bracket 125, said bracket being carried on the lower fixed framework of the machine. It will now be understood that when bolts 126, passing through elongated slots 127 of member 120, are loosened, by turning handle 122 in one direction or the other, member 120 will be raised or lowered as the case may be. By these means table 68 may be raised or lowered so as to bring a different size container into proper relation with the turret and with the work-holders of the seaming tool. Comparing Fig. 5 with Fig. 21, it will be evident that when a smaller size can is used a smaller turret is substituted in Fig. 21; and when this is done, it will be understood that the turret must be moved nearer to the seaming mechanism. This is accomplished by means of a turret supporting member 128 (see particularly Fig. 6) that is adjustable on finished surface 129 of the base plate of the machine and guided by rib on same. Means for adjusting the turret supporting member consist of a threaded stem 130 carried by a bracket 131 and in threaded engagement with said turret supporting member 128, as seen more particularly in Fig. 10. When the desired adjustment has been made, bolts 132 (Fig. 8) passing through elongated slots 133 are tightened thereby securing said turret supporting member to the base plate of the machine. As will also be seen, and especially from Fig. 6, the source of supply of covers 10 from the cover feeding hopper is likewise carried by turret supporting member 128, being preferably secured thereto by hinges 134, the lower one of which may be seen in Fig. 6, and the hinge pivot point being clearly seen in Fig. 1. In order to maintain the integrity of the drive from the power shaft 21 for rotating the turret, and for driving the power supporting means, as well as the means for driving the conveyor chain 6, worm 56 (Fig. 19) is slidingly mounted on shaft 57, and shaft 54 and its gears, as well as the entire train of gears to the turret supporting means as shown in Fig. 19, are carried by the turret support 128. It will be recalled that shaft 54 has a bevel gear 60 at its lower end by means of which the sprocket 63 of conveyor chain 6 is actuated. By considering Figs. 8 and 9, it will be understood how the integrity of this drive is maintained when the machine is adjusted. The adjustment of the turret supporting member will be either from the right or the left looking at Fig. 9; and it will be observed that bearing 135 of bevel 60 is coupled with bearing 136 of bevel 61 and, by reason of pin 137, when this adjustment takes place, carries shaft 62 with it, said shaft being mounted in a fixed bearing 138. This shaft also carries sprocket 63 mounted on sleeve 139 that is in splined engagement with shaft 62 and which has a head 140 at each end so that sprocket 63 retains its position notwithstanding sidewise adjustment of shaft 62, but is, nevertheless, driven therefrom in any adjusted position of the shaft. Owing to the fact that shaft 62 carrying sprocket 63 is mounted on adjustable table 68 or adjustable member 120 carrying said table, provision must also be made for compensating for the vertical adjustment of the table and to this end bevel gear 60 is splined by means of key 141 to shaft 54 so that if shaft 62 rises or falls, the coupled bearings 135 and 136 of the two bevel gears will cause bevel gear 60 to slide up and down on shaft 54. In order to permit the elevation of table 68 with respect to stationary support 4, over which the bodies slide while being propelled by conveyor 6, there is a hinge connection 142 between said table and said support 4 (see Figs. 5 and 6). There remain, of course, some minor adjustments that must be made. As will be readily apparent from a comparison of Fig. 5 and Fig. 21 for instance, a suitable adjustment of the detector member 82 with respect to arm 85 must be made. So also guides 143 (Fig. 21) are substituted for guides 144 (Fig. 5). It will be noted that the body enters the turret in Fig. 21 almost tangentially whereas in Fig. 5 it takes quite a sweep. So also cover guides 71 (Fig 5) are replaced by others, such as 145, of suitable shape and size with regard to the size of the cover to be fed.

The cover feeding mechanism shown herein is not claimed in this application but forms the subject matter of application Ser. No. 757,819, filed December 24, 1924.

I claim:

1. A machine of the character described comprising: two revolving heads, a plurality of individually rotating work-holders arranged in a circular group, each consisting of two opposed chucks, carried by said heads, a seaming tool having a spiral seaming surface disposed centrally of said group, and means, acting independently with respect to each work-holder, for opening and closing the two chucks of each work-holder on the work and for moving, during the seaming operation, both chucks in unison parallel to the axis of the seaming tool.

2. A machine of the character described comprising: two revolving heads, a plurality of individually rotating work-holders arranged in a circular group, each consisting of two opposed chucks, carried by said heads, a rotating seaming tool having a spiral seaming surface disposed centrally of said group, and means, acting independently with respect to each work-holder, for opening and closing the two chucks of each work-holder on the work and for moving, during the seaming operation, both chucks in unison parallel to the axis of the seaming tool.

3. A machine of the character described comprising: two revolving heads, a plurality of individually rotating work-holders arranged in a circular group, each consisting of two opposed chucks, carried by said heads, a seaming tool having a spiral seaming surface disposed centrally of said group, means, acting independently with respect to each work-holder, for opening and closing the two chucks of each work-holder on the work and for moving, during the seaming operation, both chucks in unison parallel to the axis of the seaming tool, and means for feeding bodies and covers to the work-holders.

4. A machine of the character described comprising: two revolving heads, a plurality of individually rotating work-holders arranged in a circular group, each consisting of two opposed chucks, carried by said heads, a seaming tool having a spiral seaming surface disposed centrally of said group, and stationary cams for opening and closing the two chucks of each work-holder individually on the work and for moving, during the seaming operation, both chucks in unison parallel to the axis of the seaming tool.

5. In a machine of the character set forth: a seaming tool having a spiral seaming surface, a gear connected with said seaming tool, a plurality of chucks revolving in an orbit about said seaming tool, a gear carried by each chuck to engage the gear on the seaming tool, and means for individually moving the chucks parallel to the axis of the seaming tool.

6. In a machine of the character set forth: a revolving head, a seaming tool having a spiral seaming surface extending centrally through said head, a plurality of chuck carriers mounted to slide independently of each other parallel to the axis of said seaming tool in said seaming head, chucks supported by said carriers, gears between the seaming tool and the chucks to rotate the latter from the former, and a stationary cam and connections for effecting reciprocation of the chuck carriers.

7. A machine of the character described comprising: two revolving heads, an upper and a lower one, a seaming tool extending through the upper head, a plurality of chuck carriers slidingly mounted in the upper head, rotating chucks mounted in said chuck carriers, a plurality of sliding members mounted on the lower revolving head, a pedestal on each of said sliding members, and stationary cams for effecting reciprocation of the chuck carriers and sliding members to move the pedestals and chucks toward each other and to thereafter during the seaming operation move the chucks and pedestals in unison and in an upward direction.

8. In a machine of the character set forth: a revolving head, a plurality of chuck carriers slidingly mounted in said head and arranged in a circular group, a seaming tool having a spiral surface extending centrally through said head, chucks supported by the carriers and driven from the seaming tools, means for effecting reciprocation of the chuck carriers, a lower revolving head, a plurality of reciprocating pedestals carried thereby, and a positioning device supported by the chuck carrier and having a curved positioning surface adjacent the seaming tool for centering the work on the pedestal, said surface having an opening to admit of access to the work by the seaming tool.

9. A machine of the character described comprising: upper and lower revolving heads, a seaming tool extending through the upper head, chucks carried by the upper head, gears for rotating the chucks from the seaming tool, pedestals carried by the lower head, a shaft extending across the top of the upper head, gears for driving the seaming tool from said shaft, an upright shaft, gears for revolving the two heads from the upright shaft, and gears for driving the upright shaft from the first mentioned shaft.

10. A machine of the character described comprising: upper and lower revolving heads, a seaming tool extending through the upper head, chucks carried by the upper head, gears for rotating the chucks from the seaming tool, pedestals carried by the lower head, a shaft extending across the top of the upper head, gears for driving the seaming tool from said shaft, an upright shaft, gears for revolving the two heads from the upright shaft, gears for driving the upright shaft from the first mentioned shaft, a rotatable in-feeding turret for feeding work to the pedestals, a conveyor chain for feeding work to the turret, a second upright shaft, gears for driving the second upright shaft from the first mentioned shaft, gearing including an internal gear for driving the turret from the second upright shaft, and gearing for driving the conveyor chain from the second upright shaft.

11. In a machine of the character described: a heading mechanism including work-holders, seaming means, a revolving in-feeding turret for feeding bodies to the work-holders of the heading mechanism, means for adjusting said turret toward and away from the heading mechanism, a table over which bodies slide as they are fed by the turret, and means for raising and lowering the table.

12. In a machine of the character described: a heading mechanism including work-holders, seaming means, a revolving in-feeding turret for feeding bodies to the work-holders of the heading mechanism, means for adjusting said turret toward and away from the heading mechanism, a cover magazine adjustable with the turret, a cover feeding-out guide also adjustable with the turret, and means on the turret for feeding covers to said guide.

13. In a machine of the character described: a heading mechanism including work-holders, seaming means, a revolving in-feeding turret for feeding bodies to the work-holders of the heading mechanism, means for adjusting said turret toward and away from the heading mechanism, a cover magazine adjustable with the turret, a cover feeding-out guide also adjustable with the turret, means on the turret for feeding covers to said guide, a table over which the bodies slide as they are fed by the turret, and means for vertically adjusting the table.

14. In a machine of the character set forth: a turret supporting member, a source of supply of covers carried by said turret supporting member, cover separating means, a vertical shaft on said turret support, a revolving turret on said support, gearing for revolving the turret from said upright shaft, gearing for driving the cover separating means from said upright shaft, heading mechanism, and means for adjusting the turret both toward and away from the heading mechanism.

15. In a machine of the character set forth: a turret supporting member, a source of supply of covers carried by said turret supporting member, cover separating means, a vertical shaft on said turret support, a revolving turret on said support, gearing for revolving the turret from said upright shaft, gearing for driving the cover separating means from said upright shaft, heading mechanism, means for adjusting the turret both toward and away from the heading mechanism, a power shaft carried by the heading mechanism, and gearing including a sliding member for transmitting power from said power shaft to the vertical shaft on the turret support.

16. In a machine of the character described: heading mechanism, an in-feeding turret adjacent to said heading mechanism, means for adjusting said turret toward and away from the heading mechanism, a vertically adjustable table below the turret over which the bodies slide as they are fed by said turret, a conveyor sprocket movable with the table, transmission means including a sliding member for driving the turret from the heading mechanism, transmission mechanism including sliding members for driving said sprocket from the turret, and driving means notwithstanding adjustment of the turret and adjustment of the table.

17. In a machine of the character described: an upper head having a plurality of chucks arranged in a circular group, a seaming tool centrally disposed of said chucks, a plurality of chuck carriers sliding parallel to the axis of the seaming tool, and a chuck bracket mounted in each chuck carrier and adjustable radially with respect to the seaming tool.

18. In a machine of the character described: a centrally disposed seaming tool, a plurality of work-holders comprising upper and lower chucks arranged in a group around said seaming tool, means for adjusting the chucks of said work-holders radially toward and away from the seaming tool, and means for adjusting the lower chucks vertically.

19. In a machine of the character described: a centrally disposed seaming tool, a plurality of work-holders comprising upper and lower chucks arranged in a group around said seaming tool, means for adjusting the chucks of said work-holders radially toward and away from the seaming tool, means for adjusting the lower chucks vertically, a vertically adjustable table adjacent the work-holders over which the bodies slide to enter said work-holders, a revolving in-feeding turret, and means for adjusting the in-feeding turret toward and away from the work-holders and radially of the seaming tool.

Signed at Bridgeport in the county of Fairfield and State of Connecticut this 9 day of November, 1923.

JULIUS BRENZINGER.